US008532893B2

(12) United States Patent
Tohyama et al.

(10) Patent No.: US 8,532,893 B2
(45) Date of Patent: Sep. 10, 2013

(54) AUTOMATIC TRANSMISSION (75) Inventors: Yutaka Tohyama, Kanagawa (JP);
Hideharu Yamamoto, Kanagawa (JP);
Masahiro Hamano, Shizuoka (JP);
Hiroyasu Tanaka, Kanagawa (JP);
Youhei Ishikawa, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 250 days.

(21) Appl. No.: 13/153,927

(22) Filed: Jun. 6, 2011

(65) Prior Publication Data

US 2012/0143448 A1    Jun. 7, 2012

(30) Foreign Application Priority Data

Jun. 7, 2010    (JP) ................................. 2010-129773

(51) Int. Cl.
*F16H 61/12*    (2010.01)
*F16H 63/36*    (2006.01)
(52) U.S. Cl.
USPC ................... 701/62; 701/54; 701/65; 477/41; 477/44
(58) Field of Classification Search
None
See application file for complete search history.

(56) References Cited

U.S. PATENT DOCUMENTS

| 5,944,628 | A  | * | 8/1999 | Lee ................................. 475/214 |
| 7,419,452 | B2 | * | 9/2008 | Nozaki et al. .................. 475/123 |
| 2008/0058157 | A1 | * | 3/2008 | Tasaka et al. .................. 477/125 |
| 2008/0234088 | A1 | * | 9/2008 | Kawaguchi et al. ............ 475/16 |

FOREIGN PATENT DOCUMENTS

| EP | 1 770 314 A2 | 4/2007 |
| EP | 1 944 528 A2 | 7/2008 |
| EP | 1 972 833 A2 | 9/2008 |
| JP | 2008-232355 A | 10/2008 |

* cited by examiner

*Primary Examiner* — Michael J Zanelli
(74) *Attorney, Agent, or Firm* — Foley & Lardner LLP

(57) ABSTRACT

In an automatic transmission with a speed changer having a plurality of engagement elements and configured to shift the speed changer into a selected one of a plurality of shift stages by switching engaged and disengaged states of the engagement elements, a first rotation sensor is provided for detecting input rotation of the speed changer and a second rotation sensor for detecting output rotation of the speed changer. Also provided is a transmission controller configured to determine whether a change in input torque inputted into the speed changer occurs. The transmission controller is further configured to determine that interlock has occurred in the speed changer, when there is no pulse signal output from the second rotation sensor though, during a vehicle stopped state, the input-torque change has occurred and the pulse signal from the first rotation sensor has been outputted.

6 Claims, 5 Drawing Sheets

AUTOMATIC TRANSMISSION

TECHNICAL FIELD

The present invention relates to an automatic transmission having a function that determines the presence or absence of interlock of the automatic transmission when starting an automotive vehicle from a standstill.

BACKGROUND ART

In recent years, there have been proposed and developed various interlock decision technologies in which it is determined based on a deceleration rate of a vehicle and a relation between a transmission ratio intended by a ratio-change instruction and an actual transmission ratio of an automatic transmission whether or not interlock occurs during non-shift operation of the transmission. One such interlock decision technology has been disclosed in Japanese Patent Provisional Publication No. 2008-232355 (hereinafter is referred to as "JP2008-232355"). However, the interlock decision technology disclosed in JP2008-232355, suffers from the drawback that it is impossible to detect interlock occurring during vehicle standstill. This is because a vehicle deceleration rate and a transmission ratio do not change during vehicle standstill, regardless of the presence or absence of interlock. Therefore, it would be desirable to detect interlock occurring during vehicle standstill.

SUMMARY OF THE INVENTION

It is, therefore, in view of the previously-described disadvantages of the prior art, an object of the invention to provide an automatic transmission having a high-precision interlock decision function that can more precisely determine whether interlock occurs in the transmission during vehicle standstill.

In order to accomplish the aforementioned and other objects of the present invention, an automatic transmission comprises a speed changer having a plurality of engagement elements and configured to shift the speed changer into a selected one of a plurality of shift stages by switching engaged and disengaged states of the engagement elements, first rotation sensor for detecting input rotation of the speed changer and for outputting a pulse signal indicating the input rotation, a second rotation sensor for detecting output rotation of the speed changer and for outputting a pulse signal indicating the output rotation, and a controller comprising an input-torque-change decision section for determining whether a change in input torque inputted into the speed changer occurs, and an interlock decision section for executing an interlock decision on whether interlock occurs in the speed changer, wherein the interlock decision section is configured to determine that interlock has occurred in the speed changer, when there is no pulse signal output from the second rotation sensor though, during a vehicle stopped state, the input-torque change has occurred and the pulse signal from the first rotation sensor has been outputted.

The other objects and features of this invention will become understood from the following description with reference to the accompanying drawings.

DESCRIPTION OF THE PREFERRED EMBODIMENTS

Figure 1:
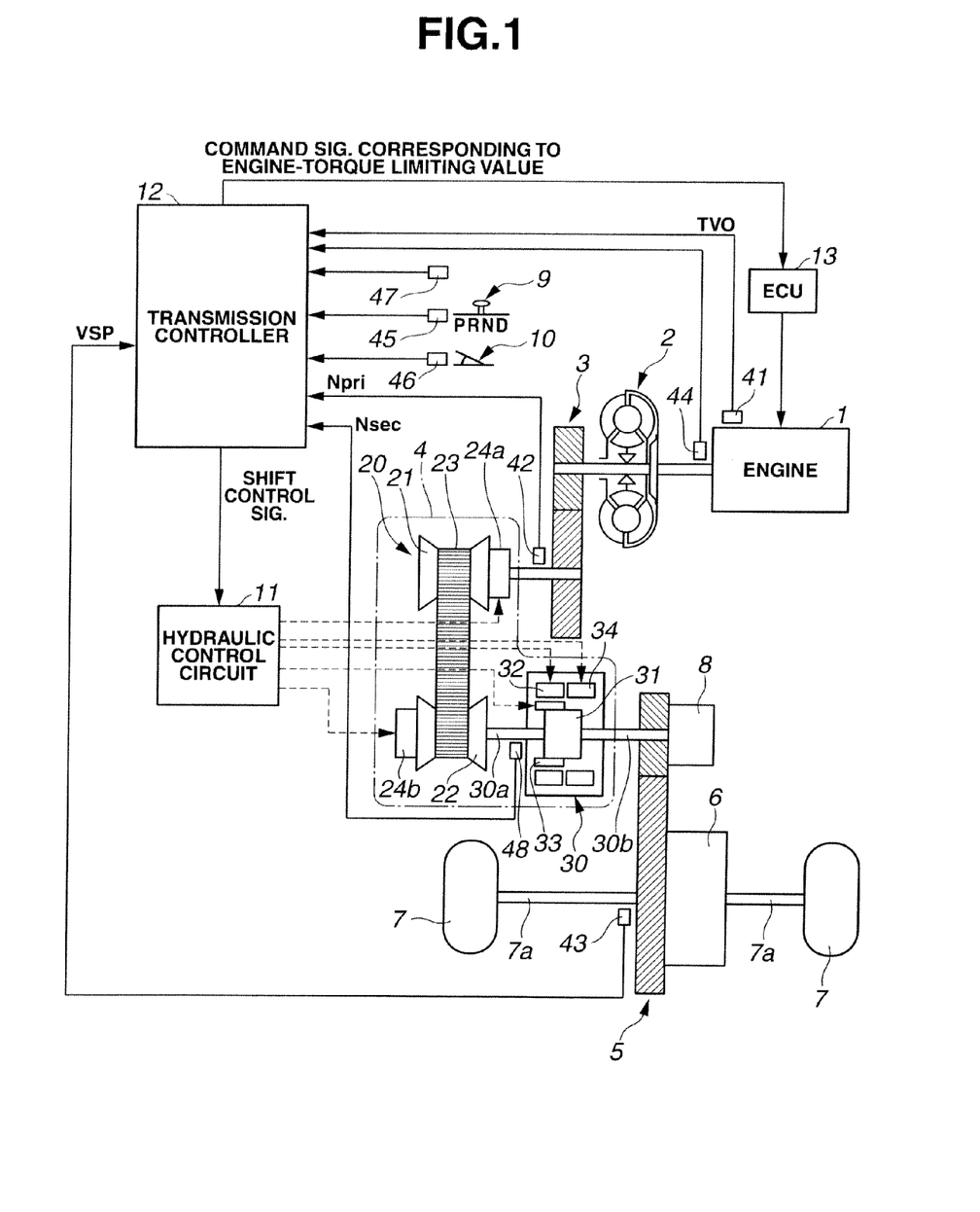
FIG. 1 is a block diagram illustrating a drivetrain of an automotive vehicle to which an automatic transmission of an embodiment is applied.

Referring now to the drawings, particularly to FIG. 1, the automatic transmission of the embodiment is exemplified in a belt-drive non-stage automatic transmission whose transmission ratio is steplessly variable. FIG. 1 shows the block diagram of the drivetrain of the automotive vehicle employing the automatic transmission of the embodiment. As shown in FIG. 1, the vehicle is equipped with an engine 1 as a driving power source. Output speed (power) of engine 1 is transmitted through a lockup-clutch equipped torque converter 2, a first gear train 3, a non-stage automatic transmission, concretely, a belt-drive continuously variable transmission (hereinafter referred to as "transmission 4"), a second gear train 5, and a final drive gear 6 via two axle driveshafts 7a, 7a to left and right drive road wheels 7, 7. A parking-lock mechanism 8 is attached to the second gear train 5 for mechanically locking an output shaft of transmission 4 when the vehicle is parked.

Also, the vehicle provided with a hydraulic control circuit 11 configured to regulate hydraulic pressure from an oil pump (not shown) and also to supply the regulated hydraulic pressure to each of hydraulically-operated friction engagement elements (simply, friction elements) and hydraulic actuators (pulley-actuation cylinders) of transmission 4, and a transmission controller 12 configured to control the hydraulic circuit 11 and so on, and an engine controller (an electronic engine control unit or an electronic engine control module) 13 configured to control the engine 1.

Transmission 4 includes a belt-drive non-stage (continuously variable) speed-change mechanism (hereinafter referred to as "variator 20"), and a sub-transmission 30 arranged in series with the variator 20. Hereupon, the "series-arrangement" of variator 20 and sub-transmission 30 means that variator 20 and sub-transmission 30 are arranged in series with each other in the path of power transmission (in the torque flow path) from engine 1 to drive road wheels 7, 7. As seen from the block diagram of FIG. 1, in the shown embodiment, the input side of sub-transmission 30 is connected directly to the output shaft of variator 20. In lieu thereof, the input side of sub-transmission 30 may be connected to the output shaft of variator 20 via an additional power-transmission unit (or an additional speed changer), such as an additional gear train.

Variator 20 is comprised of a primary pulley 21, a secondary pulley 22, and a segmented steel belt 23 running in variable-width primary and secondary pulleys 21-22.

Each of pulleys 21-22 is comprised of a pair of pulley flanges, namely, a fixed conical-surface pulley flange and a moveable conical-surface pulley flange whose sheave face is opposed to the sheave face of the fixed conical-surface pulley flange to define a V-groove between them. Additionally, primary pulley 21 has a primary-pulley actuation hydraulic cylinder 24a on the right-hand side (viewing FIG. 1), whereas secondary pulley 22 has a secondary-pulley actuation hydraulic cylinder 24b on the left-hand side (viewing FIG. 1). By adjusting the hydraulic pressure supplied to each of hydraulic cylinders 24a-24b, the position of the belt and primary-pulley width and the position of the belt and secondary-pulley width vary and the effective diameters of both pulleys 21-22 also vary, and thus a transmission ratio of variator 20 can be varied steplessly.

Sub-transmission 30 is a two-forward-and-one-reverse-speed transmission. Sub-transmission 30 is comprised of a so-called. Ravigneaux planetary gear set 31 in which a pinion of a first planetary gear set is meshed-engagement with a pinion of a second planetary gear set, and these pinions are supported on a common carrier, and a plurality of friction elements (that is, a low brake 32, a high clutch 33, and a reverse brake 34) associated with a plurality of rotating planetary-gear-system component parts constructing Ravigneaux planetary gear set 31 for changing connection/disconnection among the planetary-gear-system rotating parts. A shift stage of sub-transmission 30 can be varied by adjusting hydraulic pressure supplied to each of friction elements 32-34 and by switching between an engaged state (an applied state) and a disengaged state (a released state) of each of friction elements 32-34, in other words, by switching between a locking-up state and a releasing state of each of the planetary-gear-system rotating parts.

Concretely, when low brake 32 is applied and high clutch 33 is engaged and reverse brake 34 is released, a shift stage of sub-transmission 30 is shifted into a first-speed gear. When high clutch 33 is engaged and low brake 32 and reverse brake 34 are released, sub-transmission 30 is shifted into a second-speed gear whose gear ratio is less than the first-speed gear. Also, when reverse brake 34 is applied and low-brake 32 is released and high clutch 33 is disengaged, sub-transmission 30 is shifted into a reverse-speed gear.

The input/output interface of transmission controller 12 receives input information from various engine/vehicle switches and sensors, namely a throttle-valve opening sensor (simply, a throttle opening sensor 41), a primary rotation sensor, in other words, a primary speed sensor (e.g., a primary-pulley speed sensor) 42, a vehicle speed sensor 43, an engine speed sensor 44, an inhibitor switch 45, a brake switch 46, a road-grade sensor (simply, a grade sensor 47), and a secondary rotation sensor, in other words, a secondary speed sensor (e.g., a secondary-pulley speed sensor) 48. Throttle opening sensor 41 is provided for detecting a throttle opening TVO of a throttle valve of engine 1. Primary rotation sensor 42 is provided for detecting an input rotational speed Npri of transmission 4. Vehicle speed sensor 43 is provided for detecting a vehicle speed VSP. Engine speed sensor 44 is provided for detecting an engine speed. Inhibitor switch 45 is provided for detecting a range gear position of a selector lever 9. Brake switch 46 is provided for detecting whether a brake pedal 10 is depressed, and configured to output an ON signal when the brake pedal is depressed, and also configured to output an OFF signal when the brake pedal is not depressed. Grade sensor 47 is provided for detecting a grade angle $\Theta$ of a road surface on which the vehicle sits. For instance, when the vehicle sits on an uphill road, the uphill attitude of the vehicle corresponds to a positive grade and thus grade sensor 47 outputs a positive signal whose value is proportion to a grade of the uphill road. Conversely when the vehicle sits on a downhill road, the downhill attitude of the vehicle corresponds to a negative grade and thus grade sensor 47 outputs a negative signal whose value is proportion to a grade of the downhill road. Secondary rotation sensor 48 is provided for detecting an output rotational speed Nsec of transmission 4.

Hydraulic control circuit 11 constructed by a plurality of flow passages (hydraulic fluid lines) and a plurality of hydraulic control valves. Hydraulic control circuit 11 is configured to control the hydraulic control valves responsively to a shift control signal from transmission controller 12 for changing a fluid-flow path for hydraulic pressure supply, and also configured to regulate a hydraulic pressure produced by an oil pump (not shown) for delivering the regulated hydraulic pressure to each of the hydraulically-operated friction elements (e.g., low brake 32, high clutch 33, and reverse brake 34) and hydraulic actuators (e.g., hydraulic cylinders 24a-24b) of transmission 4. By this, a transmission ratio of variator 20 and a shift stage of sub-transmission 30 are varied, and thus a shifting action (an upshift or a downshift) of transmission 4 is achieved.

Engine controller (ECU or ECM) 13 is configured to control a throttle opening TVO and a fuel-injection quantity, thereby controlling the operating condition of engine 1. For instance, engine controller 13 controls the throttle opening TVO and/or the fuel-injection quantity responsively to a command signal outputted from transmission controller 12 and indicating an engine-torque limiting value corresponding to an engine-torque-output upper limit, such that the maximum value of torque output from engine 1 is limited to the engine-torque limiting value (the engine-torque-output upper limit).

Transmission controller 12 is configured to control the operation of variator 20 and the operation of sub-transmission 30 for ratio-change control, and further configured to execute interlock decision processing (described later) for precisely detecting or determining interlock occurring in the friction element (e.g., low brake 32, high clutch 33, or reverse brake 34) of sub-transmission 30, during vehicle standstill.

Figure 2:
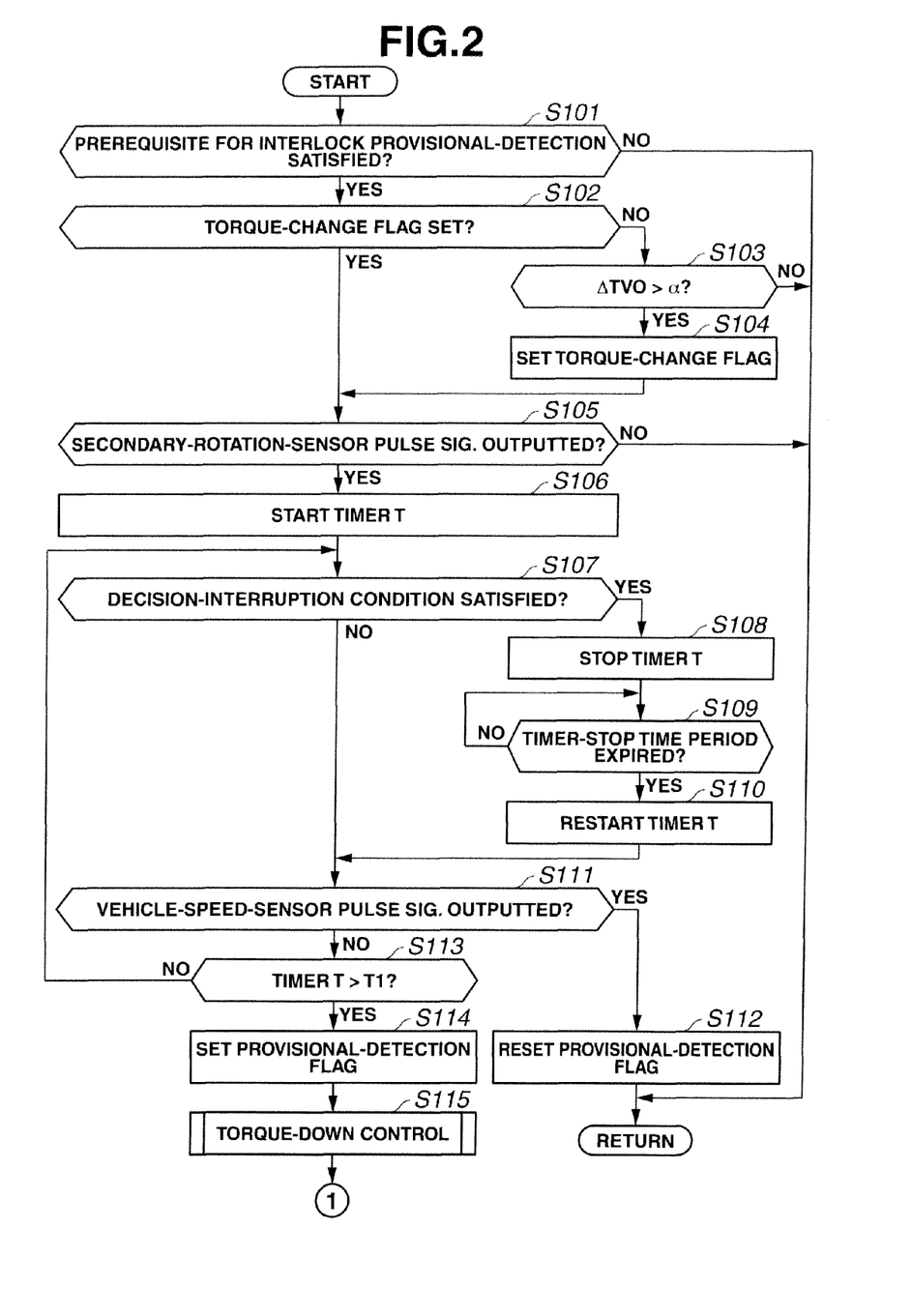
FIG. 2 is a flowchart illustrating the former half of interlock decision processing executed within a transmission controller of the automatic transmission of the embodiment.
Figure 3:
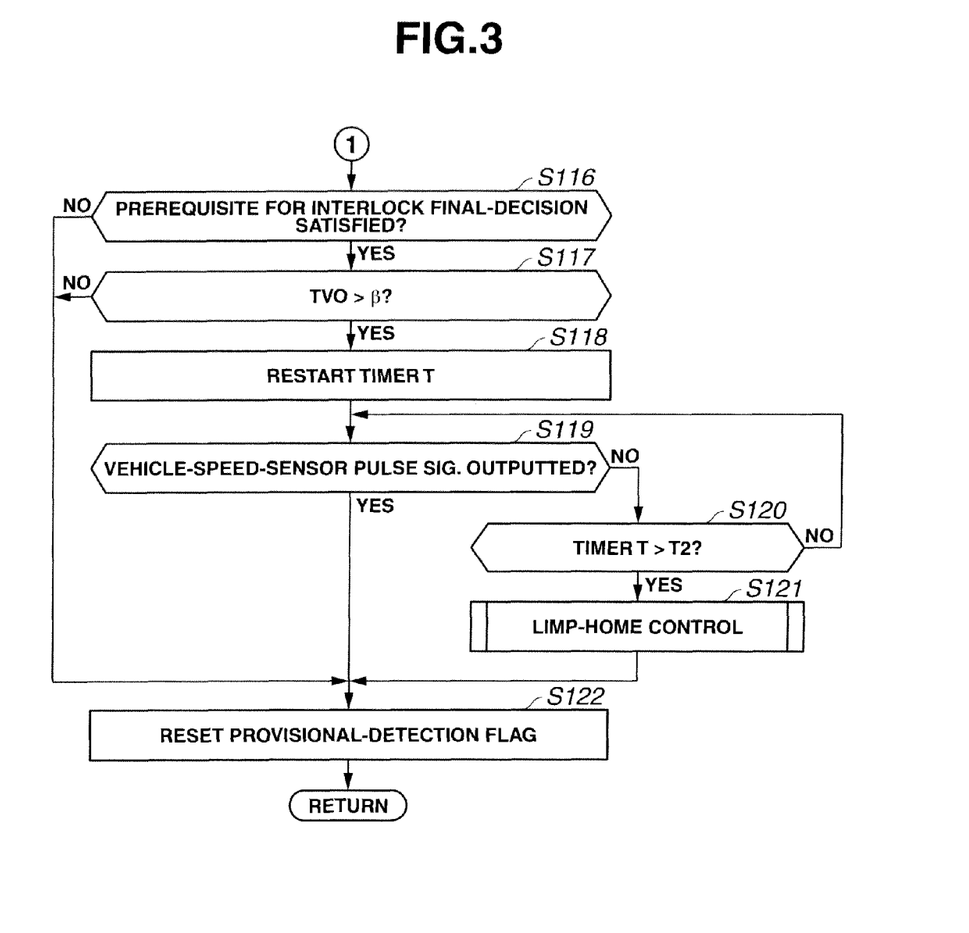
FIG. 3 is a flowchart illustrating the latter half of the interlock decision processing executed within the transmission controller of the automatic transmission of the embodiment.
Figure 4A:
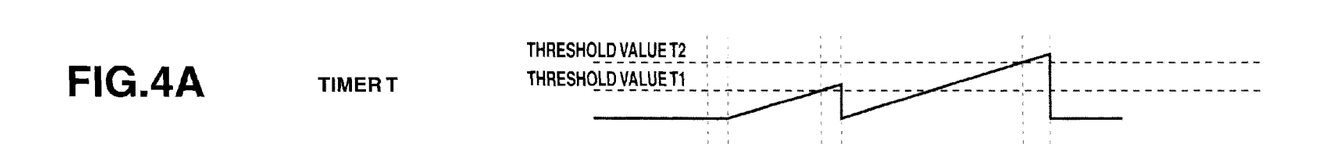
FIGS. 4A-4F are time charts illustrating details of the interlock decision processing in a situation where the vehicle is stopped on a road surface (almost level ground) whose grade angle $\Theta$ is less than or equal to a predetermined grade angle.
Figure 4B:
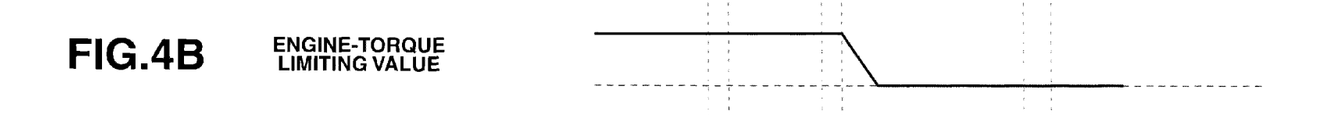
Figure 4C:
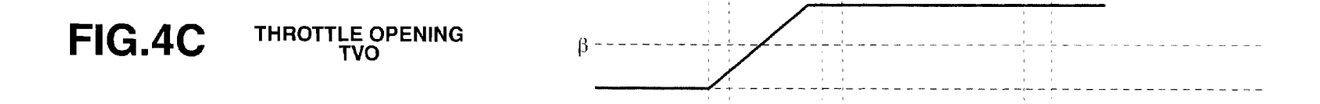
Figure 4D:
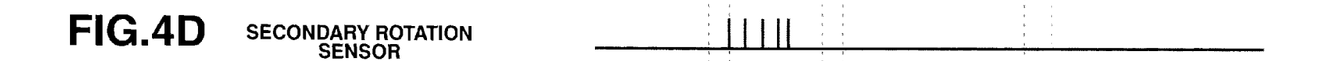
Figure 4E:
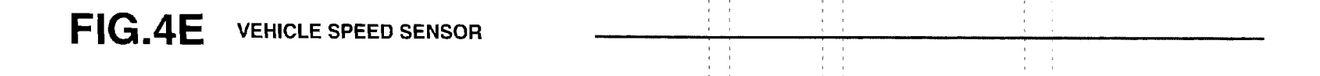
Figure 4F:
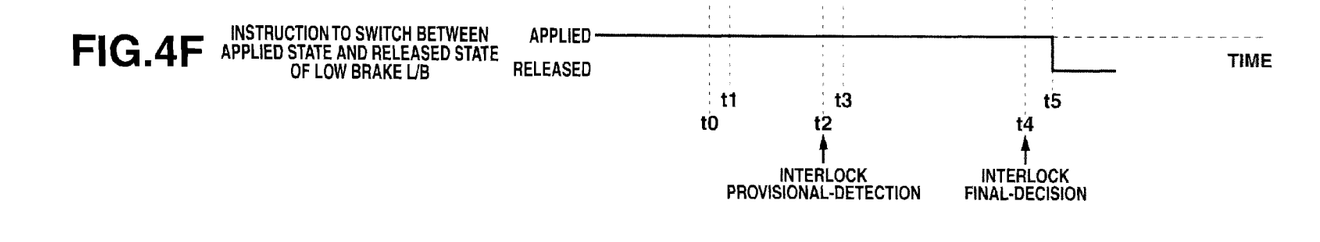

The interlock decision processing is hereunder described in detail in reference to the flowcharts of FIGS. 2 and 3 and the time charts of FIGS. 4A-4F. Note that the time charts of FIGS. 4A-4F illustrate details of the interlock decision processing in a specific situation where the vehicle is stopped on a road surface (almost level ground) whose grade angle $\Theta$ is less than or equal to a predetermined grade angle.

The interlock decision processing is repeatedly executed within transmission controller 12 as time-triggered interrupt routines to be triggered every predetermined sampling time intervals. The interlock decision processing, executed within the transmission controller 12 of transmission 4 of the embodiment, is constructed by two sorts of procedures, that is, an "interlock" provisional-detection procedure (an "interlock" provisional-decision procedure) related to the flowchart of FIG. 2 and an "interlock" final-decision procedure (an abnormality final-decision procedure) related to the flowchart of FIG. 3. Briefly speaking, according to the interlock decision processing (the interlock decision routine), this routine proceeds to the "interlock" final-decision procedure (see FIG. 3) after execution of the "interlock" provisional-detection procedure (see FIG. 2).

First, at step S101 of "interlock" provisional-detection processing of FIG. 2, a check is made to determine whether a prerequisite for provisional detection of "interlock" is satisfied. Concretely, as a prerequisite for provisional detection of "interlock", the "interlock" provisional-detection system uses two conditions, namely, (i) a first condition where the vehicle is at a standstill (i.e., in a stopped state) and (ii) a second condition where the revolution speed of secondary pulley 22 (i.e., the output rotational speed Nsec of transmission 4) is less than or equal to a predetermined speed value.

Note that, transmission controller 12 of transmission 4 of the embodiment is configured to detect the presence or absence of occurrence of "interlock" when the vehicle starts from a standstill. Hence, the first condition where the vehicle is at a standstill must be included in the prerequisite (a major premise) for the "interlock" provisional-detection procedure. Actually, transmission controller 12 is configured to specify or determine, based on an output signal (a pulse signal) from vehicle speed sensor 43, whether the first condition where the vehicle is at a standstill is satisfied.

Additionally, the second condition where the revolution speed Nsec of secondary pulley 22 is less than or equal to the predetermined speed value is included in the prerequisite (a minor premise) for the "interlock" provisional-detection procedure, for the purpose of distinguishing a friction-element undesired disengagement failure of sub-transmission 30 from a friction-element undesired engagement failure (i.e., friction-element interlock occurring due to a control valve stuck or a friction element sticking and remaining engaged) of sub-transmission 30.

In the presence of a friction-element undesired engagement failure (i.e., friction-element interlock), secondary pulley 22 (an input shaft 30a of sub-transmission 30) is locked up, and thus, even when an accelerator pedal (not shown) is depressed for starting the vehicle, the revolution speed Nsec of secondary pulley 22 (i.e., the rotational speed of input shaft 30a of sub-transmission 30) does not rise in concert with the depressed amount of the accelerator pedal.

In contrast, in the presence of a friction-element undesired disengagement failure, secondary pulley 22 (input shaft 30a of sub-transmission 30) is not locked up, and thus, when the accelerator pedal is depressed for starting the vehicle, the revolution speed Nsec of secondary pulley (i.e., the rotational speed of input shaft 30a of sub-transmission 30) rises in concert with the depressed amount of the accelerator pedal.

For the reasons discussed above, when the revolution speed Nsec of secondary pulley 22 is greater than the predetermined speed value, interlock will not occur. Therefore, when the first condition where the vehicle is at a standstill is satisfied but the second condition where the revolution speed Nsec of secondary pulley 22 is less than or equal to the predetermined speed value is unsatisfied, the answer to step S101 becomes negative (NO), and thus it is determined that, as a whole, the prerequisite for "interlock" provisional-detection is unsatisfied. Conversely when the first condition where the vehicle is at a standstill is satisfied and the second condition where the revolution speed Nsec of secondary pulley 22 is less than or equal to the predetermined speed value is satisfied, the answer to step S101 becomes affirmative (YES), and thus it is determined that the prerequisite for "interlock" provisional-detection is satisfied. Actually, transmission controller 12 is configured to specify or determine, based on an output signal (a pulse signal) from secondary rotation sensor 48, whether the second condition where the revolution speed Nsec of secondary pulley 22 is less than or equal to the predetermined speed value is satisfied. When the prerequisite for "interlock" provisional-detection is satisfied and thus the answer to step S101 is in the affirmative (YES), the routine proceeds to step S102. Conversely when the prerequisite for "interlock" provisional-detection is unsatisfied and thus the answer to step S101 is in the negative (NO), one execution cycle of the interlock decision processing terminates.

At step S102, a check is made to determine whether a torque-change flag is set (=1). The torque-change flag is a flag that indicates whether a change of torque inputted into the input shaft 30a of sub-transmission 30 occurs. For instance, when the accelerator pedal is depressed for starting the vehicle, a change of throttle opening TVO of the throttle valve of engine 1 occurs and as a result a change of input torque from engine 1 to input shaft 30a of sub-transmission 30 occurs. In such a case, due to an input-torque change, the torque-change flag is set (=1) at step S104 (described later).

When the vehicle is at a standstill, in other words, during a stopped state of the vehicle, the value of torque inputted to the input shaft 30a of sub-transmission 30 becomes almost zero or kept constant, and thus the torque-change flag is reset (=0). In this case, the routine proceeds from step S102 to step S103.

At step S103, a check is made to determine whether a time rate of change ΔTVO in throttle opening TVO is greater than a threshold value α, that is, ΔTVO>α. The result of comparison of the time rate of change ΔTVO in throttle opening TVO and its threshold value α is used to determine whether the vehicle is going to start from a standstill.

When the accelerator pedal is depressed for staring the vehicle from a standstill, the throttle opening TVO of the throttle valve of engine 1 increases in concert with the depressed amount of the accelerator pedal. Hence, through step S103, the time rate of change ΔTVO in throttle opening TVO is compared to the threshold value α needed to specify an accelerator-pedal depression operated by the driver for starting the vehicle from a standstill.

When the time rate of change ΔTVO in throttle opening TVO is greater than the threshold value α, that is, ΔTVO>α, and thus the answer to step S103 is in the affirmative (YES), the routine proceeds to step S104.

At step S104, the torque-change flag is set (=1) so as to indicate or signal that the vehicle is going to start from a standstill.

As appreciated from the above, after step S101 has determined that the prerequisite for "interlock" provisional-detection has been satisfied, a series of steps S101-S103 are repeatedly executed until it is determined that the vehicle is going to start from a standstill. As soon as it is determined that the vehicle is going to start from a standstill, the routine proceeds to step S104 so as to set the torque-change flag to "1".

Referring now to FIGS. 4A-4F, suppose that the torque-change flag becomes set (=1) at the time t0 at which the time rate of change ΔTVO in throttle opening TVO becomes greater than the threshold value α, that is, ΔTVO>α.

When step S102 determines that the torque-change flag is set or when the torque-change flag becomes set through step S104, the routine proceeds to step S105.

At step S105, a check is made to determine whether a pulse signal from secondary rotation sensor 48 is outputted.

When torque is inputted into the input shaft 30a of sub-transmission 30 and thus the input shaft 30a begins to rotate, secondary rotation sensor 48 outputs a pulse signal.

When interlock occurs, the input shaft 30a cannot rotate continuously, but a torsion occurs in the input shaft 30a due to torque transmitted from engine 1 to input shaft 30a. For this reason, even in the presence of the occurrence of interlock, the input shaft 30a can slightly rotate because of a torsion (a twisting deformation) arising from at least a play of the mating gear, and thus at least one pulse of the pulse signal can be outputted from secondary rotation sensor 48. Therefore, it is possible to determine based on the presence or absence of the pulse signal generated from secondary rotation sensor 48 whether or not torque is inputted into the input shaft 30a.

In the presence of a pulse signal output from secondary rotation sensor 48, that is, when the answer to step S105 is in the affirmative (YES), the routine proceeds to step S106. Conversely in the absence of a pulse signal output from secondary rotation sensor 48, that is, when the answer to step S105 is in the negative (NO), one execution cycle of this routine terminates.

At step S106, in order to carry out a provisional decision on whether or not interlock occurs, a timer T starts. In the time charts of FIGS. 4A-4F, timer T starts at the time t1 (in particular, see FIGS. 4A and 4D) at which the first pulse output from secondary rotation sensor 48 has occurred.

When interlock occurs, the output shaft 30b of sub-transmission 30 cannot rotate and thus rotary motion (torque) cannot be transmitted from the output shaft 30b of sub-transmission 30 through the second gear train 5 and the final drive gear 6 via the axle driveshafts 7a, 7a to drive road wheels 7, 7. In this case, there is no pulse signal output from vehicle speed sensor 43 that detects a vehicle speed, concretely, a revolution speed of axle driveshaft 7a that transmits power (torque) to the drive road wheel 7.

For the reasons discussed above, timer T starts (or set) at step S106, so as to monitor whether the given time has been expired.

Immediately after timer T has started through step S106, step S107 occurs. At step S107, a check is made to determine whether an "interlock" provisional-decision interruption condition that temporarily interrupts a counting operation of timer T is satisfied. The "interlock" provisional-decision interruption condition (simply, a decision-interruption condition) is a specific condition that temporarily interrupts a provisional decision on whether or not interlock occurs.

In the shown embodiment, under a specific condition where the vehicle is stopped on a slope way whose grade angle Θ has the possibility that the vehicle moves backward or moves forward during a starting period of the vehicle, the system temporarily interrupts the provisional decision on whether or not interlock occurs. By the way, details of the previously-discussed decision-interruption condition and timer-stop processing (related to steps S108-S110) executed when the decision-interruption condition is satisfied both described later. In the following, the flow of the "interlock" provisional-detection procedure executed when the decision-interruption condition is unsatisfied is described.

When the decision-interruption condition is unsatisfied, that is, the answer to step S107 is in the negative (NO), or when timer T restarts through step S110 (described later), step S111 occurs.

At step S111, a check is made to determine whether a pulse signal from vehicle speed sensor 43 is outputted.

When there is no pulse signal output from vehicle speed sensor 43, that is, the answer to step S111 is in the negative (NO), it is determined that the output shaft 30b of sub-transmission 30 does not rotate, even though torque is inputted into the input shaft 30a of sub-transmission 30. In such a case, the routine flows from step S111 to step S113.

At step S113, a check is made to determine whether the counted value of timer T is greater than a threshold value T1. The threshold value T1 corresponds to the previously-described given time used to provisionally determine whether interlock occurs.

In the case that the output shaft 30b of sub-transmission 30 does not rotate, even though torque is inputted into the input shaft 30a of sub-transmission 30, there are two causes other than "interlock". One of the two causes (hereinafter is referred to as "the cause (a)") is a situation where the vehicle sits on a gentle slope (i.e., a gentle uphill road) and thus torque (acting in a normal-rotational direction) inputted into the input shaft 30a of sub-transmission 30 and torque (acting in a reverse-rotational direction) acting on the output shaft 30b of sub-transmission 30 due to the positive grade of the gentle slope are balanced to each other. The other cause (hereinafter is referred to as "the cause (b)") is a situation where drive road wheel 7 has been run and stuck on a curbstone and thus locked.

When the accelerator pedal is depressed by the driver for starting the vehicle from a standstill but the vehicle does not move forward, a further driver's accelerator-pedal depression is expected. Owing to such a further accelerator-pedal depression, torque, inputted into the input shaft 30a of sub-transmission 30, tends to increase. When there is no rotation of the output shaft 30b of sub-transmission 30 owing to either the cause (a) or the cause (b), after a certain lapse of time the drive road wheel 7 (the output shaft 30a of sub-transmission 30) begins to rotate and then a pulse signal output from vehicle speed sensor 43 occurs.

Hence, in order to distinguish which of three causes (i.e., interlock, the cause (a) and the cause (b)) leads to a result that the output shaft 30b does not rotate even though torque is inputted into the input shaft 30a, a comparison check (T>T1) for the elapsed time (i.e., the counted value of timer T), which is elapsed from the time t1 (see FIG. 4A) when the first pulse output from secondary rotation sensor 48 has occurred and during which a state where there is no pulse signal output from vehicle speed sensor 43 continues, as against the threshold value T1 needed for interlock provisional-decision is made through step S113. The threshold value T1 was experimentally assured by the inventors of the present invention.

Therefore, when the counted value of timer T exceeds the threshold value T1 (i.e., T>T1) and thus the answer to step S113 becomes affirmative (YES), the routine proceeds from step S113 to step S114.

At step S114, an interlock provisional-detection flag, indicating a provisional decision that interlock occurs, is set (=1). In the time charts of FIGS. 4A-4F, at the point of time t2 when the counted value of timer T has reached the threshold value T1, the interlock provisional-detection flag is set.

Conversely when the counted value of timer T is less than or equal to the threshold value T1 (i.e., T≦T1) and thus the answer to step S113 is in the negative (NO), the routine returns back to step S107. That is, a series of steps S107, S111, and S113 are repeatedly executed until it is determined that the counted value of timer T exceeds the threshold value T1.

In contrast, when there is no rotation of the output shaft 30b of sub-transmission 30 due to either the cause (a) or the cause (b), a pulse signal output from vehicle speed sensor 43, indicating that drive road wheel 7 (axle driveshaft 7a) is rotating, will occur before the counted value of timer T exceeds the threshold value T1. Under this condition, the routine proceeds from step S111 to step S112.

At step S112, the interlock provisional-detection flag is reset and thus cleared to "0".

In the case that the interlock provisional-detection flag is set through step S114, the system provisionally determines that interlock occurs. Thereafter, step S115 occurs.

At step S115, torque-down control (torque-decrease control) is initiated, such that a signal value of the command signal, outputted from transmission controller 12 to engine controller 13 and indicating an engine-torque limiting value (an engine-torque-output upper limit), is changed to a lower value.

In the case that, due to interlock occurring during vehicle standstill, the vehicle does not move forward even with the accelerator pedal depressed by the driver for starting the vehicle from a standstill, a further driver's accelerator-pedal depression is expected. Owing to such a further accelerator-pedal depression, engine torque output tends to further increase.

Under these conditions, suppose that the undesirable interlock is inadvertently canceled. In such a case, the increased engine torque may be rapidly transmitted to drive road wheels 7, thus resulting in a sudden recovery of driving force. To avoid this, that is, to prevent or suppress such a sudden recovery of driving force, immediately after it has been provisionally determined that interlock occurs (see step S114), torque-down control is initiated (see step S115) by which a signal value of the command signal from transmission controller 12 to engine controller 13, indicating an engine-torque limiting value (an engine-torque-output upper limit), is changed to a lower value. By virtue of the torque-down control, even when interlock inadvertently canceled, it is possible to avoid a large engine torque from being rapidly transmitted to drive road wheels 7, thus preventing a sudden recovery of driving force.

In the time charts of FIGS. 4A-4F, torque-down control is initiated from the time t3 (see FIG. 4B) immediately after the counted value of timer T has reached the threshold value T1 (see the time t2 in FIG. 4A), such that a command signal value, corresponding to the engine-torque limiting value, is decreased to a lower value.

After it has been provisionally determined that interlock occurs (see step S114) and then torque-down control has been initiated (see step S115), the "interlock" final-decision (the abnormality final-decision) procedure related to the flowchart of FIG. 3 is executed.

First, at step S116 of "interlock" final-decision processing (abnormality final-decision processing) of FIG. 3, a check is made to determine whether a prerequisite for abnormality final-decision is satisfied. Concretely, as a prerequisite for abnormality final-decision, the "interlock" final-decision system uses at least the previously-described second condition where the revolution speed of secondary pulley 22 (i.e., the output rotational speed Nsec of transmission 4) is less than or equal to the predetermined speed value. Thus, when the second condition where the revolution speed Nsec of secondary pulley 22 is less than or equal to the predetermined speed value is satisfied, the answer to step S116 becomes affirmative (YES), and thus it is determined that the prerequisite for abnormality final-decision is satisfied.

By the provision of the previously-discussed prerequisite for abnormality final-decision ("interlock" final-decision), it is possible to avoid an erroneous "interlock" decision, which may arise from two cases, one being cancellation of interlock immediately after it has been provisionally determined that the interlock occurs, and the other being a vehicle-speed-sensor failure due to which there is no pulse signal output from vehicle speed sensor 43.

In the absence of the occurrence of "interlock", when the accelerator pedal is depressed for starting the vehicle from a standstill, the revolution speed Nsec of secondary pulley 22 increases in concert with the depressed amount of the accelerator pedal.

In contrast, in the presence of the occurrence of "interlock", secondary pulley 22 cannot rotate continuously and thus the revolution speed Nsec of secondary pulley 22 becomes less than or equal to the predetermined speed value.

In the case that the revolution speed Nsec of secondary pulley 22 becomes greater than the predetermined speed value even after having been provisionally determined that interlock occurs, the system denies the positive "interlock" provisional decision for the reason that the interlock has been canceled or the occurrence of interlock has been erroneously determined due to a failure in vehicle speed sensor 43 (no pulse signal output from the failed vehicle speed sensor 43) though interlock never occurs. Thus, when the prerequisite for abnormality final-decision is unsatisfied, that is, the answer to step S116 is in the negative (NO), the routine proceeds to step S122.

At step S122, the interlock provisional-detection flag is reset (cleared to "0").

Conversely when the revolution speed of secondary pulley 22 is less than or equal to the predetermined speed value and thus the prerequisite for abnormality final-decision is satisfied, that is, the answer to step S116 is in the affirmative (YES), the routine proceeds from step S116 to step S117.

At step S117, a check is made to determine whether throttle opening TVO is greater than a threshold value $\beta$, that is, TVO>$\beta$. The result of comparison of the throttle opening TVO and its threshold value $\beta$ is used to determine whether the driver depresses the accelerator pedal for starting the vehicle.

When interlock occurs in the presence of the driver's accelerator-pedal depression for starting the vehicle, the vehicle cannot start. In such a situation, the driver continues to depress the accelerator pedal or the driver more strongly depresses the accelerator pedal. Thus, throttle opening TVO is held at a predetermined value or more.

In contrast, when the accelerator pedal is temporarily depressed by the driver with no driver's intention to start the vehicle, a rise in throttle opening TVO is temporary. Thus, throttle opening TVO tends to drop soon.

Hence, in order to distinguish the presence or absence of a driver's intention for vehicle starting, the threshold value $\beta$ is needed. The threshold value $\beta$ was experimentally assured by the inventors of the present invention. At step S117, the system finally determines, based on the result of comparison between latest up-to-date information about throttle opening TVO and the threshold value $\beta$, whether the accelerator pedal is depressed with a driver's intention for vehicle starting, that is, whether the vehicle is going to start.

When throttle opening TVO is greater than the threshold value $\beta$, that is, TVO>$\beta$, and thus the answer to step S117 is in the affirmative (YES), it is determined that the vehicle is going to start. Thus, the routine proceeds from step S117 to step S118. Conversely when throttle opening TVO is less than or equal to the threshold value $\beta$, that is, TVO$\leq\beta$, and thus the answer to step S117 is in the negative (NO), the routine proceeds to step S122 so as to reset the interlock provisional-detection flag.

At step S118, in order to carry out a final decision on whether or not interlock occurs, the timer T restarts. In the time charts of FIGS. 4A-4F, timer T restarts at the time t3 (in particular, see FIGS. 4A and 4B) at which the torque-down control has been initiated immediately after interlock has been provisionally detected or determined at the time t2. As soon as the timer T restarts, step S119 occurs.

At step S119, a check is made to determine whether a pulse signal from vehicle speed sensor 43 is outputted.

When there is no pulse signal output from vehicle speed sensor 43, that is, the answer to step S119 is in the negative (NO), it is determined that the output shaft 30b of sub-transmission 30 does not rotate successively, even though torque is inputted into the input shaft 30a of sub-transmission 30. In such a case, the routine proceeds from step S119 to step S120.

At step S120, a check is made to determine whether the counted value of timer T is greater than a threshold value T2 used to finally determine the presence or absence of occurrence of "interlock".

When the counted value of timer T is less than or equal to the threshold value T2 (i.e., T$\leq$T2) and thus the answer to step S120 is in the negative (NO), the routine returns back to step S119. That is, a series of steps S119 and S120 are repeatedly executed until it is determined that the counted value of timer T exceeds the threshold value T2.

Conversely when a state where there is no pulse signal output from vehicle speed sensor 43 continues and as a result the counted value of timer T becomes greater than the threshold value T2 (i.e., T>T2), it is finally determined that interlock occurs. Thus, the routine proceeds from step S120 to step S121.

At step S121, limp-home control (described later) is executed. Prior to execution of the limp-home control, an interlock final-decision flag may be set (=1) at step S121.

In the shown embodiment, transmission controller 12 is configured to detect the presence or absence of occurrence of "interlock" when the vehicle starts from a standstill. Thus, if interlock occurs under such a situation (that is, when starting the vehicle from a standstill), high clutch 33 remains engaged. Therefore, according to the limp-home control, transmission controller 12 generates a command signal, which signal is required to release the low brake 32, to hydraulic control circuit 11. As a result of this, low brake 32 is shifted to its released state, and thus the vehicle can move forward with the sub-transmission 30 shifted to the second-speed gear. In the time charts of FIGS. 4A-4F, at the time t5 (in particular, see FIGS. 4A and 4F) just after the point of time t4 when the counted value of timer T has reached the threshold value T2, limp-home control is initiated so as to change the low brake (L/B) 32 from the applied state to the released state and simultaneously the counting operation of timer T terminates.

After the limp-home control has been executed at step S121, step S122 occurs.

At step S122, the interlock provisional-detection flag is reset (cleared to "0").

In contrast, when step S119 determines that a pulse sensor output from vehicle speed sensor 43 occurs before the counted value of timer T exceeds the threshold value T2, the system denies the positive "interlock" provisional decision for the reason that the interlock has been canceled or interlock never occurs though the occurrence of interlock has been provisionally determined. Thus, when the answer to step S119 is in the affirmative (YES), the routine proceeds to step S122 so as to reset the interlock provisional-detection flag.

As will be appreciated from the above, in the transmission of the embodiment, according to the "interlock" provisional-detection processing related to the flowchart of FIG. 2, immediately after the occurrence of interlock has been provisionally detected or determined (see the time t2 of FIGS. 4A-4F), torque-down control is executed, thereby preventing or suppressing a sudden recovery of driving force, which may occur due to inadvertent cancellation of the interlock. According to the "interlock" final-decision processing executed subsequently to the "interlock" provisional-detection processing (abnormality final-decision processing) needed to finally determine whether the interlock really occurs, immediately after the occurrence of interlock has been finally determined, limp-home control is executed, thereby enabling selection of a shift stage (e.g., a second-speed gear) that can continue the vehicle running condition.

Hereinafter described in detail in reference to the flowchart of FIG. 2 and the time charts of FIGS. 5A-5F are the previously-discussed decision-interruption condition and timer-stop processing (related to steps S108-S110) executed under a specific condition where the vehicle is stopped on a slope way whose grade angle $\Theta$ is greater than the predetermined grade angle during a starting period of the vehicle. FIGS. 5A-5F are time charts illustrating the decision-interrupt processing (timer-stop processing) executed under the specific condition where the vehicle is stopped on a slope way whose grade angle $\Theta$ is greater than the predetermined grade angle during a starting period of the vehicle.

At the point of time when the accelerator pedal is depressed under the specific condition where the vehicle is stopped on a slope way whose grade angle $\Theta$ is greater than the predetermined grade angle, the revolution speed of secondary pulley 22 becomes less than or equal to the predetermined speed value used to distinguish whether the vehicle is running. Thus, the prerequisite for "interlock" provisional-detection becomes satisfied at step S101. Immediately after the accelerator pedal is depressed under the specific condition, the routine proceeds from step S102 to step S103, since the torque-change flag is still reset.

Also, when the accelerator pedal is depressed, a time rate of change $\Delta TVO$ in throttle opening TVO becomes greater in concert with the depressed amount of the accelerator pedal. The time rate of change $\Delta TVO$ becomes greater than the threshold value $\alpha$ needed to specify an accelerator-pedal depression operated by the driver for starting the vehicle from a standstill. Thus, at step S104, the torque-change flag is set (=1).

Referring now to FIGS. 5A-5F, suppose that the torque-change flag becomes set (=1) at the time t0 at which the time rate of change $\Delta TVO$ becomes greater than the threshold value $\alpha$, that is, $\Delta TVO > \alpha$.

Thereafter, immediately when a pulse signal from secondary rotation sensor 48 is outputted, timer T starts (see the flow from step S105 to step S106 in FIG. 2), and then a check is made to determine whether the "interlock" provisional-decision interruption condition that temporarily interrupts a counting operation of timer T is satisfied through step S107. In the time charts of FIGS. 5A-5F, timer T starts at the time t1 (in particular, see FIGS. 5A and 5D) at which the first pulse output from secondary rotation sensor 48 has occurred.

Actually, at step S107, in order to determine whether the decision-interruption condition is satisfied, two conditions are checked. More concretely, the first check is made to determine, based on an output signal from grade sensor 47, whether the grade angle $\Theta$ of a slope way, specified by the grade-sensor signal, is greater than a threshold value Th1 (corresponding to the predetermined grade angle) that the vehicle moves backward or moves forward during a starting period of the vehicle. Additionally, the second check is made to determine, based on an output signal from brake switch 46, whether switching from an applied state of the brakes (i.e., an ON state of the brake switch) to a released state of the brakes (i.e., an OFF state of the brake switch) has occurred. When the grade angle $\Theta$ of a slope way, specified by the grade-sensor signal, is greater than a threshold value Th1, that is, $\Theta > Th1$, and switching from an ON state of the brake switch to an OFF state of the brake switch has occurred, it is determined that the decision-interruption condition is satisfied. Thus, the routine proceeds from step S107 to step S108.

At step S108, timer T is temporarily stopped to interrupt the counting operation of timer T.

In the shown embodiment, transmission controller 12 is configured to determine that interlock does not occur, when rotary motion of drive road wheel 7 (axle driveshaft 7a) is detected after having detected rotation of secondary pulley 22. However, assume that interlock occurs when starting the vehicle, which has been stopped on a slope way. There is a possibility that the vehicle, which sits on a slope way whose grade angle $\Theta$ is greater than the threshold value Th1 (the predetermined grade angle), moves backward or moves forward due to a play of the mating gear. In such a case, there is a risk that a pulse signal from vehicle speed sensor 43 is outputted owing to the slight backward or forward movement of the vehicle and thus it is erroneously determined that interlock does not occur.

To avoid this, that is, to prevent a pulse signal output from vehicle speed sensor 43, arising from a slight movement of the vehicle sitting on a slope way whose grade angle $\Theta$ is greater than the threshold value Th1 due to a play of the mating gear upon releasing the brakes, from being detected, by the timer-stop processing (that is, a series of steps S108, S109, and S110), timer T is temporarily stopped for a predetermined timer-stop time period during which, even when a pulse signal output from vehicle speed sensor 43 is detected, an "interlock" provisional-decision is interrupted under a specific condition where the vehicle is stopped on a slope way whose grade angle $\Theta$ is greater than the threshold value Th1. By this, it is possible to avoid an erroneous determination that interlock does not occur, arising from the pulse signal output from vehicle speed sensor 43 during the timer-stop time period.

In the time charts of FIGS. 5A-5F, during a predetermined time period (ta-tb) from the time to when the brakes become released (in other words, brake switch 46 becomes shifted to an OFF state) and thus the decision-interruption condition becomes satisfied to the time tb, the counting operation of timer T is continuously interrupted. Thus, even when a pulse signal output from vehicle speed sensor 43 is detected for the predetermined time period (ta-tb), the routine never shifts to step S111, until timer T restarts (see step S110) upon expiration of the predetermined timer-stop time period (ta-tb). Hence, it is possible to avoid an erroneous determination that interlock does not occur, even when starting the vehicle from a standstill on a slope way whose grade angle $\Theta$ is greater than the threshold value Th1.

At step S109, a check is made to determine whether the predetermined timer-stop time period has expired. When the predetermined timer-stop time period has expired, that is, the answer to step S109 is in the affirmative (YES), the routine proceeds from step S109 to step S110.

At step S110, timer T restarts, and thereafter the routine proceeds to step S111. Detailed description of steps S111-S115 will be omitted because the above description thereon seems to be self-explanatory.

Figure 5A:
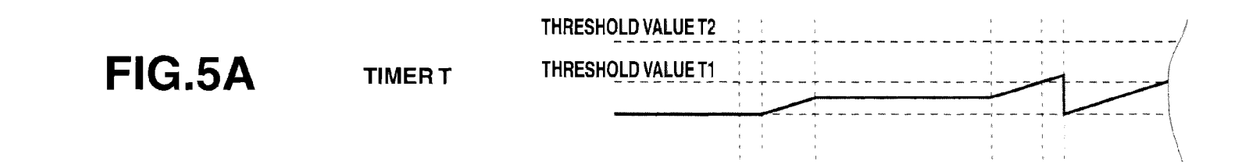
FIGS. 5A-5F are time charts illustrating details of the interlock decision processing in a situation where the vehicle is stopped on a road surface (slope way) whose grade angle $\Theta$ is greater than the predetermined grade angle.
Figure 5B:
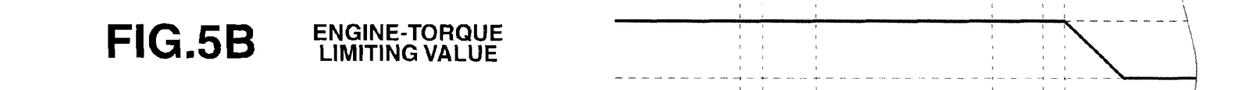
Figures 5C, 5D:
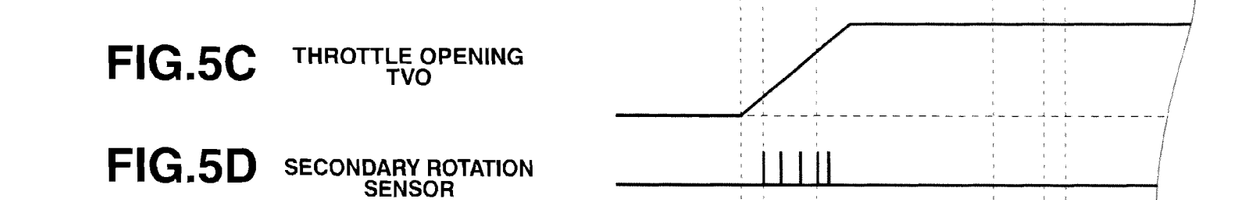
Figure 5E:
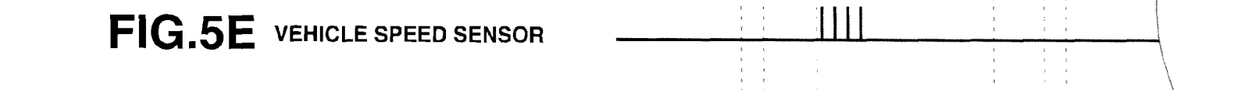
Figure 5F:
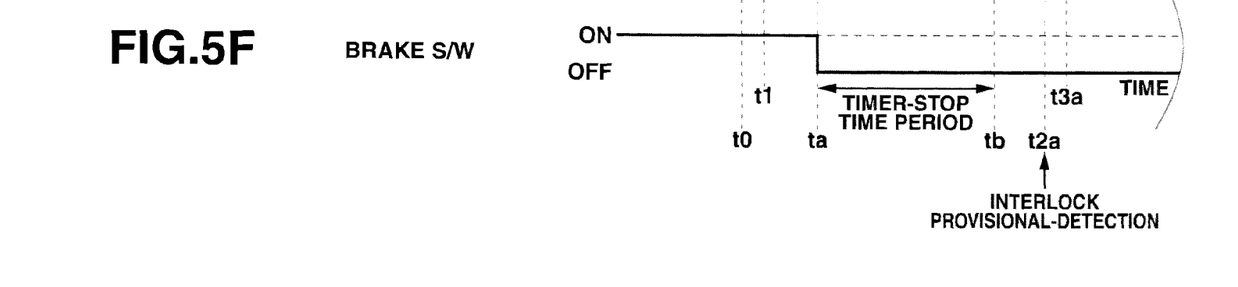

By the way, in the time charts of FIGS. 5A-5F, timer T restarts at the time tb (in particular, see FIG. 5A). Thereafter, a pulse signal output from vehicle speed sensor 43 is not detected during the time period (tb-t2a) from the timer-restart time tb to the time t2a when the counted value of timer T reaches the threshold value T1 needed for interlock provisional-decision, and therefore the interlock provisional-detection flag is set (see the flow from step S111 via step S113 to step S114). Torque-down control is initiated from the time t3a (see FIG. 5B) immediately after the counted value of timer T has reached the threshold value T1 (see the time t2a in FIG. 5A). Conversely when a pulse signal output from vehicle speed sensor 43 is detected during the time period (tb-t2a) from the timer-restart time tb to the time t2a, the interlock provisional-detection flag is reset (see the flow from step S111 to step S112).

In the shown embodiment, secondary rotation sensor 48 serves as a first rotation sensor, vehicle speed sensor 43 serves as a second rotation sensor, primary rotation sensor 42 serves as a third rotation sensor, and sub-transmission 30 serves as a speed changer.

Also, in the shown embodiment, step S103 serves as an input-torque-change decision means, steps S101, S105, S106, S111-S114 serve as an interlock decision means. Additionally, step S107 serves as a road-grade detection means and a brake-release detection means. Steps S108-S110 serve as a decision-stop means. Furthermore, step S115 serves as a torque-down control means, whereas steps S117-S121 serve as a limp-home control means.

As discussed above, in the shown embodiment, an automatic transmission includes sub-transmission 30 having a plurality of engagement elements (e.g., low brake 32, high clutch 33, and reverse brake 34) and configured to shift sub-transmission 30 into a selected one of a plurality of shift stages by switching engaged and disengaged states of the engagement elements, secondary rotation sensor 48 (the first rotation sensor) for detecting input rotation of sub-transmission 30 (rotation of input shaft 30*a*) and for outputting a pulse signal indicating the input rotation, and vehicle speed sensor 43 (the second rotation sensor) for detecting output rotation of sub-transmission 30 (rotation of axle driveshafts 7*a*) and for outputting a pulse signal indicating the output rotation. Also provided is a controller including an input-torque-change decision means (an input-torque-change decision section) for determining whether a change in input torque inputted into sub-transmission 30 occurs and an interlock decision means (an interlock decision section) for executing an interlock decision on whether interlock occurs in sub-transmission 30. The interlock decision means is configured to determine that interlock has occurred in sub-transmission 30, when there is no pulse signal output from vehicle speed sensor 43 though, during a vehicle stopped state, the input-torque change has occurred and the pulse signal from secondary rotation sensor 48 has been outputted.

Due to a change in torque (input torque) inputted into sub-transmission 30 occurring when starting the vehicle from a standstill, a torsion occurs in the input shaft 30*a* of sub-transmission 30 and thus a pulse signal from secondary rotation sensor 48 is outputted. At this time, in the case that interlock occurs in sub-transmission 30, the input torque is not transmitted to the power train after the output shaft 30*b* of sub-transmission 30, and thus there is no pulse signal output from vehicle speed sensor 43, which detects a revolution speed of drive road wheel 7 (axle driveshaft 7*a*).

Therefore, when a change in input torque inputted into sub-transmission 30 has occurred, it is possible to determine, based on the presence or absence of a pulse signal output from secondary rotation sensor 48 and the presence or absence of a pulse signal output from vehicle speed sensor 43, whether interlock occurs during vehicle standstill.

Additionally, the presence or absence of interlock in sub-transmission 30 is determined based on the pulse signal outputted from vehicle speed sensor 43. Thus, there is no risk that a wheel lock-up condition, occurring under specific situations, one being a situation where the vehicle sits on a gentle slope (i.e., a gentle uphill road) and thus torque (acting in a normal-rotational direction) inputted into the input shaft 30*a* of sub-transmission 30 and torque (acting in a reverse-rotational direction) acting on the output shaft 30*b* of sub-transmission due to the positive grade of the gentle slope are balanced to each other, and the other being a situation where drive road wheel 7 has been run and stuck on a curbstone and thus locked, is erroneously determined or regarded as interlock occurring in sub-transmission 30. Hence, it is possible to precisely determine interlock occurring in sub-transmission 30 during vehicle standstill.

In particular, the interlock decision means is configured to determine that interlock has occurred in sub-transmission 30, when there is no pulse signal output from vehicle speed sensor 43 though, under a condition where the vehicle is in the stopped state and the input rotation of sub-transmission 30

(the rotation of input shaft 30a) is less than or equal to a predetermined speed value, the input-torque change has occurred and the pulse signal from secondary rotation sensor 48 has been outputted.

By this, when the input rotation of sub-transmission 30 is less than or equal to the predetermined speed value, a decision on whether or not interlock occurs is made. Hence, it is possible to prevent a friction-element undesired disengagement failure of friction engagement elements (e.g., low brake 32, high clutch 33, and reverse brake 34) of sub-transmission 30 or a vehicle-speed-sensor failure due to which a pulse signal cannot be outputted from vehicle speed sensor 43 from being erroneously determined or regarded as interlock occurring in sub-transmission 30. Hence, it is possible to more precisely determine interlock occurring in sub-transmission 30 during vehicle standstill.

The automatic transmission of the embodiment further includes a belt-drive non-stage speed-change mechanism (variator 20) constructed by variable-width primary and secondary pulleys 21-22 and belt 23 running in the primary and secondary pulleys, and primary rotation sensor 21 (the third rotation sensor) for detecting rotation of primary pulley 21. Sub-transmission 30 is arranged in series with the output side of variator 20. Secondary rotation sensor 48 is configured to detect a revolution speed of secondary pulley 22 (a revolution speed of input shaft 30a of sub-transmission 30).

With the previously-noted arrangement, the occurrence "interlock" can be determined based on a pulse signal from vehicle speed sensor 43 and a pulse signal from at least one of primary rotation sensor 42 and secondary rotation sensor 48. For instance, suppose that an interlock decision system is configured to determine, based on a pulse signal from primary rotation sensor 42 and a pulse signal from vehicle speed sensor 43, whether or not interlock occurs. When there is no pulse signal output from vehicle speed sensor 43 though a pulse signal from primary rotation sensor 42 has been outputted, it is difficult to distinguish whether there is no torque-transmission to the output side of sub-transmission 30 due to interlock occurring in sub-transmission 30 or there is no torque-transmission to the output side of sub-transmission 30 due to a slippage of belt 23 of the belt-drive non-stage speed-change mechanism (variator 20). In this modified interlock decision system, it is impossible to precisely determine the occurrence of interlock in sub-transmission 30.

In contrast, in the interlock decision system of the embodiment, which is configured to determine, based on a pulse signal from secondary rotation sensor 48 and a pulse signal from vehicle speed sensor 43, whether or not interlock occurs, it is possible to prevent a slippage of belt 23 of the non-stage speed-change mechanism (variator 20) from being erroneously determined or regarded as an interlock condition of sub-transmission 30. Hence, it is possible to more precisely determine interlock occurring in sub-transmission 30 during vehicle standstill.

The automatic transmission of the embodiment further includes a road-grade detection means (a road-grade detection section) for detecting whether the vehicle is stopped on a slope way whose grade angle Θ is greater than a predetermined grade angle (e.g., a threshold value Th1), a brake-release detection means (a brake-release detection section) for detecting whether the brakes of the vehicle have been released, and a decision-stop means (a decision-stop section) for temporarily stopping the interlock decision, executed by the interlock decision means on whether or not interlock occurs, for a predetermined time period, when it is detected by the road-grade detection means that the vehicle is stopped on the slope way whose grade angle Θ is greater than the predetermined grade angle and it is detected by the brake-release detection means that the brakes of the vehicle have been released.

Suppose that the brakes are released during vehicle standstill on a slope way. In such a case, there is a possibility that slight rotation of the output shaft (axle driveshaft 7a) in a normal-rotational direction (on a downhill road) or in a reverse-rotational direction (on an uphill road) occurs due to a play of the mating gear of the power train (the torque-transmission drivetrain) and thus vehicle speed sensor 43 outputs at least one pulse even when sub-transmission 30 is subjected to interlock.

As discussed previously, by temporarily stopping (interrupting) a decision on the presence or absence of occurrence of interlock for the predetermined time period upon detecting that the brakes have been released during vehicle standstill on a slope way, it is possible to prevent a situation where a pulse signal from vehicle speed sensor 43 is outputted owing to a slight backward or forward movement of the vehicle sitting on a slope way, which movement may occur due to a play of the mating gear, from being erroneously determined such that interlock does not occur. Hence, it is possible to more precisely determine interlock occurring in sub-transmission 30 during vehicle standstill.

The automatic transmission of the embodiment further includes a torque-down control means (a torque-down control section) for executing torque-decrease control that decreases an upper limit of a driving force (an output torque) produced by a prime mover (engine 1) of the vehicle, when it is determined that interlock has occurred in sub-transmission 30.

With the previously-noted arrangement, by virtue of execution of torque-down control immediately after a positive "interlock" provisional decision, that is, immediately after the interlock decision means has provisionally determined that interlock has occurred, it is possible to prevent an undesirably rapid large-torque transmission, in other words, a sudden recovery of driving force, even in the event that the interlock is canceled with the accelerator pedal remaining depressed.

The automatic transmission of the embodiment further includes a limp-home control means (a limp-home control section) for executing limp-home control that enables the vehicle to run, when the input torque is exceeding a given torque value (e.g., a threshold value β) and there is no pulse signal output from vehicle speed sensor 43 for a given time (e.g., a threshold value T2) after having been determined that interlock has occurred.

With the previously-noted arrangement, when the input torque is exceeding a given torque value and there is no pulse signal output from vehicle speed sensor 43 for a given time after the occurrence of interlock has been provisionally detected, that is, after the interlock decision means has provisionally determined that interlock has occurred, it is finally determined that interlock certainly occurs in sub-transmission 30, and then limp-home control is executed so as to change to a shift stage that enables the vehicle to run.

In the shown embodiment, a plurality of engagement elements are exemplified in friction engagement elements installed in sub-transmission 30, and the interlock decision processing, performed by transmission controller 12, is utilized for precisely detecting or determining a friction-element undesired engagement failure (i.e., friction-element interlock). The engagement elements are not limited to such friction engagement elements. In place of friction engagement elements, the fundamental concept of the invention may be applied to transmission-synchronizing devices, each having a coupling sleeve (a synchronizer sleeve), balk rings, a synchronizer hub, and so on, and the interlock decision processing of transmission controller 12 may be utilized for precisely detecting or determining a synchronizer undesired engagement failure (i.e., synchronizer interlock).

In the shown embodiment, a speed changer of the automatic transmission is exemplified in sub-transmission 30, which is a two-forward-and-one-reverse-speed transmission switchable between two different shift stages, namely, a low-speed shift stage and a high-speed shift stage. The plurality of shift stages are not limited to such two forward-speed shift stages. The fundamental concept of the invention may be applied to another type of speed changer switchable among two or more different shift stages, such as a speed changer switchable among three or more forward-speed shift stages, a forward/reverse (F/R) changeover mechanism equipped speed changer employing a F/R changeover mechanism comprised of a planetary gear set, a forward clutch and a reverse brake, and switchable between a forward-speed shift stage and a reverse-speed shift stage.

In the shown embodiment, a speed changer of the automatic transmission is exemplified in sub-transmission 30 combined with a non-stage transmission, concretely, a belt-drive continuously variable transmission (CVT), that is, variator 20 in such a manner as to be arranged in series with the output side of the CVT. The speed changer is not limited to such a sub-transmission combined with a non-stage transmission. In lieu thereof, The fundamental concept of the invention may be applied to a stepped automatic transmission whose number of speeds is limited or finite.

In the shown embodiment, an input-torque-change decision means is configured to determine that a change in input torque inputted into the input shaft 30*a* of sub-transmission 30 occurs when a rate of change $\Delta$TVO in throttle opening TVO is greater than a given threshold value $\alpha$. Instead of using such a method to detect an input torque change based on the result of comparison between the time rate of change $\Delta$TVO in throttle opening TVO and its threshold value $\alpha$, another method of input-torque-change detection may be used. For instance, an input-torque change may be detected based on engine-torque information sent via a controller area network (CAN) communications line. Alternatively, an input-torque change may be detected or determined based on at least one of an accelerator opening, an engine speed detected by engine speed sensor 44, and a rate of change in internal slippage in torque converter 3.

In the shown embodiment, when a rate of change $\Delta$TVO in throttle opening TVO is greater than a given threshold value $\alpha$, in other words, when an increase in input torque occurs, it is determined that a change in torque, inputted into the input shaft 30*a*, has occurred. In contrast, in the presence of a change in input torque in a direction for decreasing the input torque, it may be determined that a change in torque, inputted into the input shaft 30*a*, has occurred.

In the shown embodiment, the interlock decision system is configured to determine, based on a pulse signal from secondary rotation sensor 48 (the first rotation sensor) and a pulse signal from vehicle speed sensor 43 (the second rotation sensor), whether or not interlock occurs. Alternatively, an interlock decision may be made by means of the previously-described modified interlock decision system, which is configured to determine, based on a pulse signal from primary rotation sensor 42 (the third rotation sensor) and a pulse signal from vehicle speed sensor 43 (the second rotation sensor), whether or not interlock occurs. The modified interlock decision system, using pulse signals from the second and third rotation sensors (i.e., vehicle speed sensor 43 and primary rotation sensor 42), is inferior to the interlock decision system of the embodiment, using pulse signals from the first and second rotation sensors (i.e., secondary rotation sensor 48 and vehicle speed sensor 43), in high-precision interlock detection, but provides almost the same operation and effects as the embodiment.

Furthermore, in order to more remarkably enhance the accuracy of interlock decision processing, (i) the interlock decision system of the embodiment, using pulse signals from the first and second rotation sensors (i.e., sensors 48 and 43), and (ii) the modified interlock decision system, using pulse signals from the second and third rotation sensors (i.e., sensors 43 and 42), may be combined with each other to provide a dual system configuration for interlock decision processing.

In the shown embodiment, by the use of a road-grade sensor 47 that detects a grade angle $\Theta$ of a road surface on which the vehicle sits, it is determined whether the vehicle is stopped on a slope way whose grade angle $\Theta$ is greater than a predetermined grade angle. In lieu thereof, navigation information (map information) from a navigation system installed on the vehicle and positional information (latitude-and-longitude information) of the vehicle, detected by means of a global positioning system (GPS) may be used to determine whether the vehicle is stopped on a slope way whose grade angle $\Theta$ is greater than a predetermined grade angle.

In the shown embodiment, engine 1 (an internal combustion engine) is used as a prime mover. The prime mover is not limited to such an internal combustion engine. In lieu thereof, at least one of an electric motor and an internal combustion engine may be used as a prime mover. For instance, like a parallel hybrid vehicle, torque may be inputted from both an electric motor and an internal combustion engine to the transmission input shaft.

In the shown embodiment, during execution of torque-down control, an engine-torque limiting value (an engine-torque-output upper limit) is set, and then the maximum output value of engine torque is limited to the engine-torque limiting value. In lieu thereof, torque-down control may be achieved by decreasing an engine torque output by a given amount depending on a degree of accelerator opening. That is, another type of torque-down control, by which an upper limit of driving force (output torque) produced by a prime mover can be properly decreased to a lower value, may be applied.

In the case of the automatic transmission of the shown embodiment, under a condition where it is finally determined that interlock certainly occurs in the speed changer (sub-transmission 30), the cause of the interlock occurrence can be regarded as a failure in high clutch 33 remaining engaged. Hence, during execution of limp-home control, low brake 32 is released and thus the speed changer (sub-transmission 30) is shifted to a higher-speed shift stage (concretely, the second-speed gear). In lieu thereof, another type of limp-home control capable of attaining a fail-safe function that enables the vehicle to run even in the presence of the occurrence of interlock in the speed changer, may be applied.

The entire contents of Japanese Patent Application No. 2010-129773 (filed Jun. 7, 2010) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic transmission comprising:
a speed changer having a plurality of engagement elements and configured to shift the speed changer into a selected one of a plurality of shift stages by switching engaged and disengaged states of the engagement elements;
a first rotation sensor for detecting input rotation of the speed changer and for outputting a pulse signal indicating the input rotation;
a second rotation sensor for detecting output rotation of the speed changer and for outputting a pulse signal indicating the output rotation; and
a controller comprising:
an input-torque-change decision section for determining whether a change in input torque inputted into the speed changer occurs; and
an interlock decision section for executing an interlock decision on whether interlock occurs in the speed changer,
wherein the interlock decision section is configured to determine that interlock has occurred in the speed changer, when there is no pulse signal output from the second rotation sensor though, during a vehicle stopped state, the input-torque change has occurred and the pulse signal from the first rotation sensor has been outputted.

2. The automatic transmission as claimed in claim 1, wherein:
the interlock decision section is configured to determine that interlock has occurred in the speed changer, when there is no pulse signal output from the second rotation sensor though, under a condition where the vehicle is in the stopped state and the input rotation of the speed changer is less than or equal to a predetermined speed value, the input-torque change has occurred and the pulse signal from the first rotation sensor has been outputted.

3. The automatic transmission as claimed in claim 1, further comprising:
a non-stage speed-change mechanism constructed by variable-width primary and secondary pulleys and a belt running in the primary and secondary pulleys; and
a third rotation sensor for detecting rotation of the primary pulley,
wherein the speed changer is arranged in series with an output side of the non-stage speed-change mechanism, and the first rotation sensor is configured to detect a revolution speed of the secondary pulley.

4. The automatic transmission as claimed in claim 1, further comprising:
a road-grade detection section for detecting whether the vehicle is stopped on a slope way whose grade angle is greater than a predetermined grade angle;
a brake-release detection section for detecting whether brakes of the vehicle have been released; and
a decision-stop section for temporarily stopping the interlock decision, executed by the interlock decision section on whether or not interlock occurs, for a predetermined time period, when it is detected by the road-grade detection section that the vehicle is stopped on the slope way whose grade angle is greater than the predetermined grade angle and it is detected by the brake-release detection section that the brakes of the vehicle have been released.

5. The automatic transmission as claimed in claim 1, further comprising:
a torque-down control section for executing torque-decrease control that decreases an upper limit of a driving force produced by a prime mover of the vehicle, when it is determined that interlock has occurred in the speed changer.

6. The automatic transmission as claimed in claim 1, further comprising:
a limp-home control section for executing limp-home control that enables the vehicle to run, when the input torque is exceeding a given torque value and there is no pulse signal output from the second rotation sensor for a given time after having been determined that interlock has occurred.

* * * * *